: US012515638B2

(12) United States Patent
Jang

(10) Patent No.: US 12,515,638 B2
(45) Date of Patent: Jan. 6, 2026

(54) METHOD AND APPARATUS FOR OPTIMAL CONTROL OF DRIVING TORQUE FOR SMOOTH RIDE ON UNEVEN ROAD

(71) Applicant: Hyundai Kefico Corporation, Gyeonggi-do (KR)

(72) Inventor: Jin Ho Jang, Gyeonggi-do (KR)

(73) Assignee: Hyundai Kefico Corporation, Gyeonggi-Do (KR)

( * ) Notice: Subject to any disclaimer, the term of this patent is extended or adjusted under 35 U.S.C. 154(b) by 315 days.

(21) Appl. No.: 17/979,452

(22) Filed: Nov. 2, 2022

(65) Prior Publication Data

US 2023/0138941 A1 May 4, 2023

(30) Foreign Application Priority Data

Nov. 3, 2021 (KR) .................. 10-2021-0149911

(51) Int. Cl.
*B60W 30/02* (2012.01)
*B60W 30/18* (2012.01)
(Continued)

(52) U.S. Cl.
CPC .......... *B60W 30/025* (2013.01); *B60W 30/02* (2013.01); *B60W 40/06* (2013.01); *B60W 40/107* (2013.01); *B60W 40/11* (2013.01); *B60W 50/0098* (2013.01); *B60W 30/18* (2013.01); *B60W 2050/0022* (2013.01); *B60W 2520/105* (2013.01); *B60W 2520/14* (2013.01); *B60W 2520/16* (2013.01); *B60W 2552/35* (2020.02); *B60W 2710/105* (2013.01); (Continued)

(58) Field of Classification Search
CPC .. B60W 30/025; B60W 40/107; B60W 40/11; B60W 50/0098; B60W 2050/0022; B60W 2520/105; B60W 2520/16; B60W 2720/106; B60W 2720/16; B60W 2710/105; B60W 30/18; B60W 40/06; B60W 30/02; B60W 2520/14; B60W 2552/35; B60W 50/00; B60Y 2400/304
See application file for complete search history.

(56) References Cited

U.S. PATENT DOCUMENTS

2018/0079415 A1 3/2018 Moriya et al.
2021/0053553 A1* 2/2021 Akanda .................. B60W 20/11

FOREIGN PATENT DOCUMENTS

CN 103754224 A 4/2014
CN 109213139 A 1/2019
(Continued)

OTHER PUBLICATIONS

Espacenet Machine Translation of (Year: 2018).*

*Primary Examiner* — Kito R Robinson
*Assistant Examiner* — Zachary E. F. Glade
(74) *Attorney, Agent, or Firm* — Fox Rothschild LLP

(57) ABSTRACT

In one aspect, an apparatus for control of a driving torque for smooth riding on an uneven road is provided that comprises a pitch motion reduction objective function, a longitudinal acceleration reduction objective function, and a jerk reduction objective function are calculated using an acceleration value and a jerk constraint of a vehicle, and weights are reflected in these objective functions to calculate a final driving torque and applied to the vehicle, thereby reducing pitch motion, longitudinal acceleration, and jerk.

16 Claims, 6 Drawing Sheets

(51) Int. Cl.
*B60W 40/06* (2012.01)
*B60W 40/107* (2012.01)
*B60W 40/11* (2012.01)
*B60W 50/00* (2006.01)

(52) U.S. Cl.
CPC ... *B60W 2720/106* (2013.01); *B60W 2720/16* (2013.01); *B60Y 2400/304* (2013.01)

(56) References Cited

FOREIGN PATENT DOCUMENTS

| | | | | |
|---|---|---|---|---|
| FR | 2890905 | A1 | 3/2007 | |
| GB | 2479431 | A * | 10/2011 | ............ B60W 30/02 |
| JP | 2018050388 | A * | 3/2018 | ............ B60W 30/02 |
| KR | 97-0069430 | A | 11/1997 | |
| KR | 10-2017-0033529 | A | 3/2017 | |
| KR | 10-2018-0006669 | A | 1/2018 | |
| KR | 10-2021-0037785 | A | 4/2021 | |

* cited by examiner

METHOD AND APPARATUS FOR OPTIMAL CONTROL OF DRIVING TORQUE FOR SMOOTH RIDE ON UNEVEN ROAD

CROSS-REFERENCE TO RELATED APPLICATION

This application claims the benefit under 35 U.S.C. § 119(a) of Korean Patent Application No. 10-2021-0149911, filed on Nov. 3, 2021 in the Korean Intellectual Property Office, the entire disclosure of which is incorporated herein by reference for all purposes.

1. FIELD

In one aspect, the present disclosure relates to control of a drive system of a vehicle, and more particularly, to a technique for optimally controlling a driving torque for a smooth ride on an uneven road such as one having a bump or a dip.

2. BACKGROUND

When a vehicle passes along an uneven road (e.g., with bumps, dips, etc.), unintended pitch motion and longitudinal acceleration are added to a sprung mass of a vehicle, resulting in a decrease in ride comfort. Here, "sprung mass" is a term mainly used for modeling a vehicle load and refers to an upper portion of a vehicle where people are riding. On the other hand, a lower vehicle body structure is called an unsprung mass.

In order to minimize vertical displacement of the sprung mass, certain active suspension, of a vehicle is mainly utilized, to attempt to improve ride comfort. For example, Korean Patent Laid-Open Publication No. 10-1997-0069430 (Nov. 7, 1997) reports a certain level adjustment device for a vehicle.

SUMMARY

Conventionally, there was only control that would seek to alleviate a vertical fluctuation (pitch motion) occurring when a vehicle passes along an uneven road, by using proportional gain control (P control). However, we have found that a vehicle traversing an uneven road or ground surface can be significantly affected by longitudinal acceleration and jerk in addition to the pitch motion.

In one aspect, the present disclosure is directed to providing a control method and apparatus for improving ride comfort by reducing the longitudinal acceleration and jerk as well as the pitch motion occurring when passing along an uneven road.

In order to improve ride comfort by reducing a change in pitch (pitch motion) occurring while a vehicle passes over a bump or a dip, it can be required to maintain the pitch motion at zero. In particular, in a front-wheel-drive vehicle, this is realized by generating a driving torque in a direction opposite to a direction of increasing or decreasing the pitch.

Accordingly, along with the control of the pitch motion, the ride comfort is adjusted and improved by appropriately adjusting a longitudinal acceleration and a degree of jerk of a vehicle. For example, in the event that a front nose of a vehicle is raised (entering a bump or escaping from a dip), a torque is generated in a direction opposite to a traveling direction of the vehicle to perform control for the front nose of the vehicle to be lowered, and conversely, in the event that the front nose of the vehicle is lowered (escaping from a bump or entering a dip), a torque is generated in the traveling direction of the vehicle to perform control for the front nose of the vehicle to be raised.

In order to perform this control, based on optimal control, a pitch motion reduction objective function, a longitudinal acceleration reduction objective function, and a jerk reduction objective function are calculated using an acceleration constraint and a jerk constraint of a vehicle, and weights are reflected in these objective functions to calculate a final driving torque and applied to the vehicle, thereby reducing the pitch motion, the longitudinal acceleration, and the jerk.

In one aspect, a method of optimal or enhanced control of a driving torque for riding on an uneven road or ground surface is provided, the method comprising steps of: a) calculating torque candidate group from an estimated pitch rate; b) generating a pitch motion reduction objective function from the torque candidate group; c) estimating vehicle acceleration candidate group corresponding to the torque candidate group generated in step a); d) generating a longitudinal acceleration reduction objective function by synthesizing a predetermined acceleration constraint and the estimated vehicle acceleration candidate group; e) estimating jerk candidate group by calculating a current acceleration value obtained from a sensor together with the vehicle acceleration candidate group estimated in step c); f) generating a jerk reduction objective function by synthesizing the set jerk constraint and the jerk candidate group; and g) selecting a candidate having the smallest value among the objective functions and determining the driving torque corresponding to the selected candidate.

In certain aspects of a preferred method, in step b), the pitch motion reduction objective function is generated in inverse proportion to a size of driving torque candidate group so that the pitch motion reduction objective function gradually decreases as a magnitude of the driving torque increases.

In additional aspects of a preferred method, in step d), the longitudinal acceleration reduction objective function is generated in proportion to a size of driving torque candidate group so that the longitudinal acceleration reduction objective function gradually increases as a magnitude of the driving torque increases.

In further aspects of a preferred method, in step e), a size of an objective function increases in a region above the acceleration constraint.

In yet additional aspects of a preferred method in step f), an objective function is generated in proportion to a size of driving torque candidate group so that the jerk reduction objective function gradually increases as a magnitude of the driving torque increases.

As discussed, the method and system suitably include use of a controller or processer. Thus, in the above method, the method may comprise steps of: a) calculating via a controller torque candidate group from an estimated pitch rate; b) generating via a controller a pitch motion reduction objective function from the torque candidate group; c) estimating via a controller vehicle acceleration candidate group corresponding to the torque candidate group generated in step a); d) generating via a controller a longitudinal acceleration reduction objective function by synthesizing a predetermined acceleration constraint and the estimated vehicle acceleration candidate group; e) estimating via a controller jerk candidate group by calculating a current acceleration value obtained from a sensor together with the vehicle acceleration candidate group estimated in step c); f) generating via a controller a jerk reduction objective function by synthesizing the set jerk constraint and the jerk candidate group; and g) selecting via a controller a candidate having the smallest value among the objective functions and determining the driving torque corresponding to the selected candidate.

In another embodiment, vehicles are provided that comprise an apparatus or system as disclosed herein.

A configuration and operation of the present disclosure will become clearer through specific embodiments described later with reference to the drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION

Figure 1:
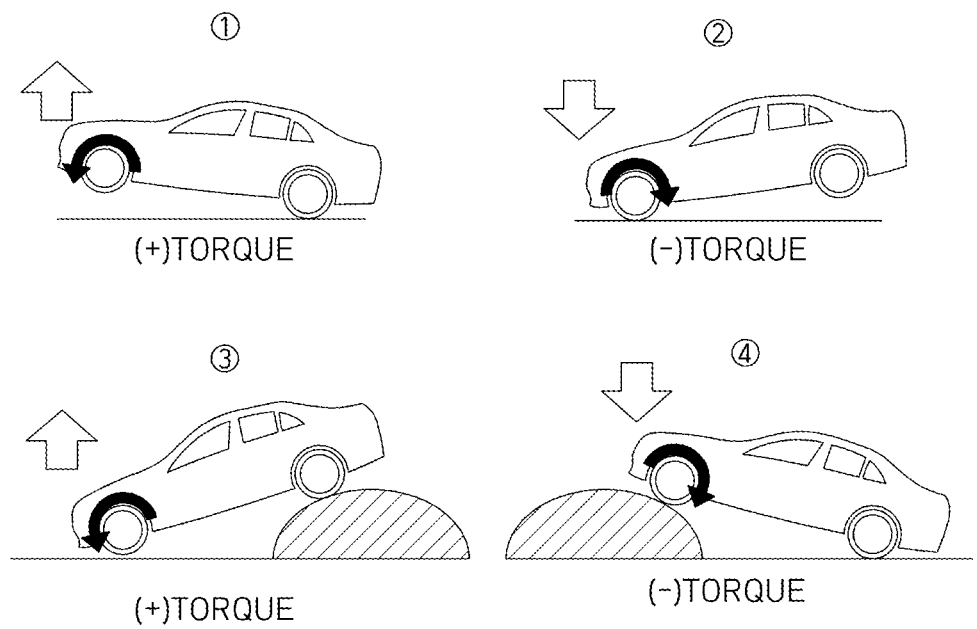
FIG. 1 is a schematic explanatory diagram of control of ride comfort according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the teens "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Advantages and features of the present disclosure and methods accomplishing them will become apparent from exemplary embodiments described in detail with reference to the accompanying drawings. However, the present disclosure is not limited to the embodiments described below, but may be embodied in various other forms. Embodiments are only provided to completely disclose the present disclosure and to completely inform those skilled in the art to which the present disclosure pertains of the scope of the disclosure, and the present disclosure will be defined by the claims. In addition, terms used herein are for explaining embodiments rather than limiting the present disclosure. Unless otherwise stated, a singular form includes a plural form in the present specification. In addition, components, steps, operations, and/or elements described by the terms "comprise," "comprising," and the like used herein do not exclude the existence or addition of one or more other components, steps, operations, and/or elements.

Hereinafter, exemplary embodiments of the present disclosure will be described in detail with reference to the accompanying drawings. In describing embodiments, well-known constructions or functions will not be described in detail since they may unnecessarily obscure the understanding of the present disclosure.

An overview of ride comfort control according to the present disclosure will be described with reference to FIG. 1.

As a vehicle passes along uneven roads such as those with bumps and dips, a pitch motion changes (squat and dive). To improve ride comfort, it is required to keep pitch motion to zero (0). In the present disclosure, in a front-wheel-drive vehicle, the pitch motion is offset by generating a vehicle torque in a direction opposite to a direction of increasing or decreasing the pitch motion. In addition, along with the control of the pitch motion, the ride comfort is adjusted and improved by appropriately adjusting a longitudinal acceleration and a degree of jerk of a vehicle.

In addition, in the event that a front nose of a vehicle is raised (e.g., entering a bump or escaping from a dip), a driving torque (i.e., braking torque) is generated in a direction opposite to a traveling direction of the vehicle to perform control for the front nose of the vehicle to be lowered. Conversely, in the event that the front nose of the vehicle is lowered (e.g., escaping from a bump or entering a dip), a driving torque (i.e., acceleration torque) is generated in the traveling direction of the vehicle to perform control for the front nose of the vehicle to be raised.

In FIG. 1, ① is a control situation in which a front-wheel driving acceleration torque is generated in the traveling direction of the vehicle so that the front nose of the vehicle is raised, and this control is required when escaping from a bump as in ③. Also, ② is a control situation in which a front-wheel braking torque is generated in the direction opposite to the traveling direction of the vehicle so that the front nose of the vehicle is lowered, and this control is required in when entering a bump as in ④.

Unlike a bump, in the case of a dip, the control is performed in the opposite direction to the above. Therefore, in the following description, the control for a bump will be mainly described.

Figure 2:
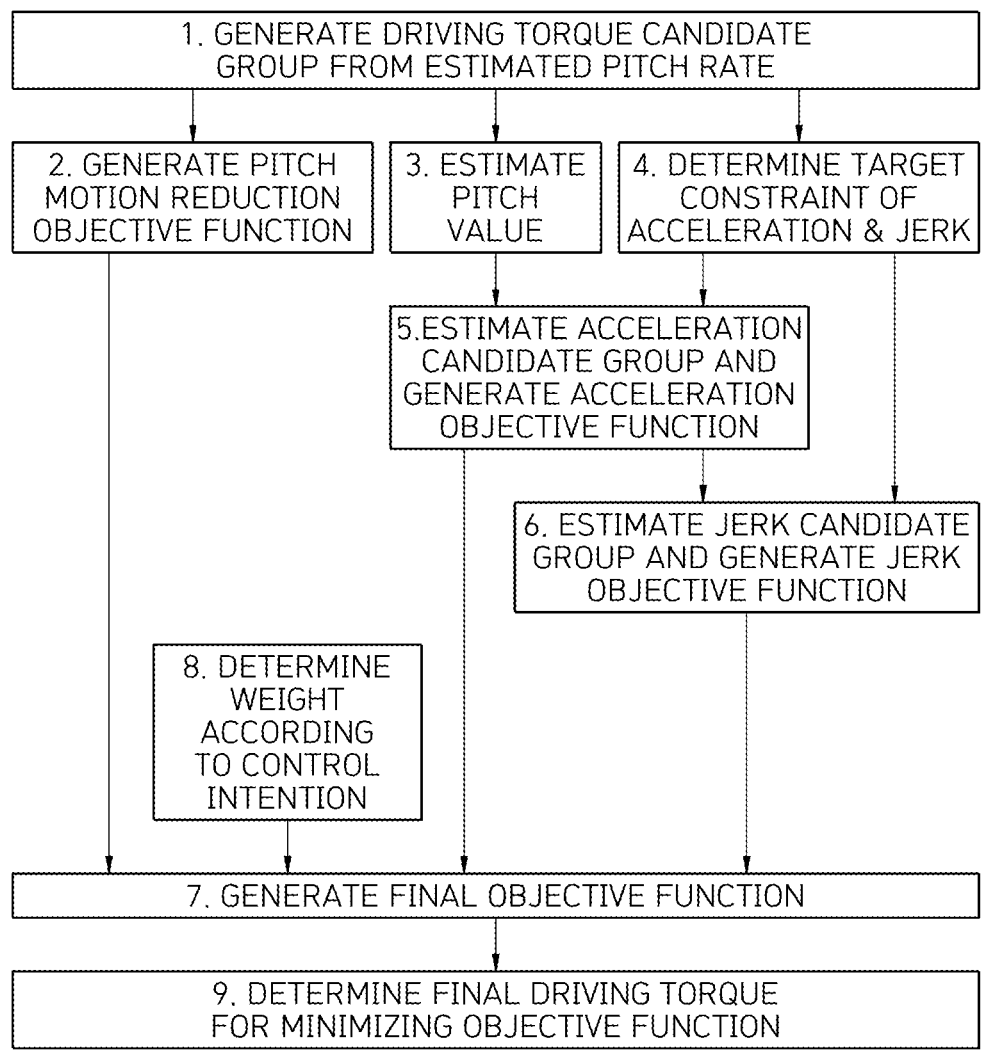
FIG. 2 is a logic flow diagram of a method of controlling ride comfort according to the present disclosure.
Figure 3:
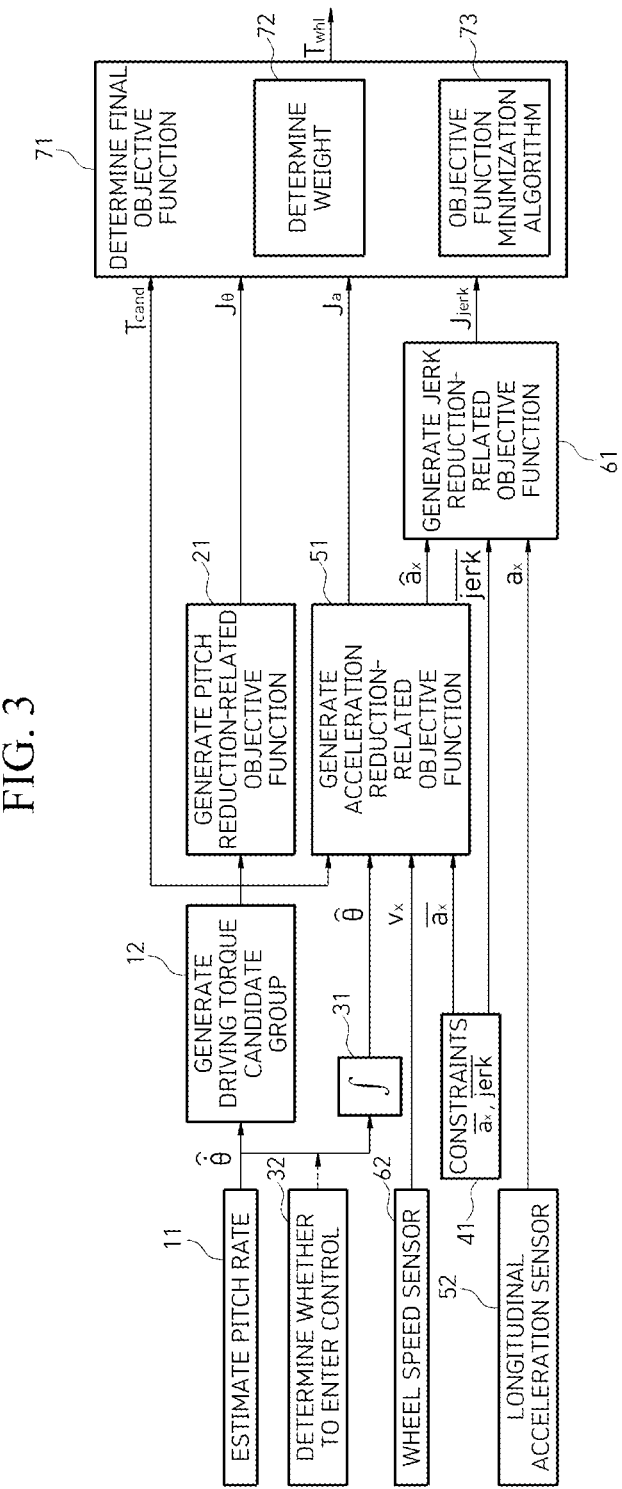
FIG. 3 is a block diagram of an apparatus for controlling ride comfort according to the present disclosure.

FIG. 2 is a flowchart of ride comfort control logic according to the present disclosure, and FIG. 3 is a block diagram of an apparatus for controlling ride comfort by determining a driving torque according to the present disclosure.

First, abbreviations used in the following description will be introduced.

- $\hat{\theta}$: Estimated pitch, or estimated pitch motion, $\dot{\hat{\theta}}$: Estimated pitch rate
- $v_x$: Longitudinal velocity, $a_x$: longitudinal acceleration, $\hat{a}_x$: estimated longitudinal acceleration, $\overline{a_x}$: Longitudinal acceleration target constraint
- $\overline{jerk}$: Longitudinal jerk target constraint
- $T_{whl,cand}$: Wheel applied driving torque candidate group, $T_{whl}$: Final driving torque
- u: Control input, u*: Optimal control input
- $k_u$: Proportional gain candidate group for calculating driving torque
- $J, J^{(x,u)}$: Objective function, or cost function
- $J_\theta$: Pitch motion reduction of objective function, $J_a$: Longitudinal acceleration reduction of objective function, $J_{jerk}$: Jerk reduction of objective function. Each of these may be calculated by the following Equations.

$$J_\theta(x, u) = \frac{1}{\left(k_u \dot{\hat{\theta}}\right)^2},$$

$$J_a(x, u) = \begin{cases} \sqrt{(\hat{a}_x)^2} & (|a_x| \leq |\overline{a_x}|) \\ \text{Penalty} & (|a_x| > |\overline{a_x}|) \end{cases},$$

$$J_{jerk}(x, u) = \begin{cases} \sqrt{(jerk)^2} & (|jerk| \leq |\overline{jerk}|) \\ \text{Penalty} & (|jerk| > |\overline{jerk}|) \end{cases}$$

$w_1$ and $w_2$: Weight of objective function (corresponding to acceleration reduction and jerk reduction, respectively).

An optimal control method and apparatus for improving ride comfort according to the present disclosure will be described with reference to FIGS. 2 and 3. The description of the apparatus of FIG. 3 will be added while mainly describing the description of the method process of FIG. 2.

1. Generate Driving Torque Candidate Group From Estimated Pitch Rate of Vehicle

A pitch rate estimation unit 11 may calculate the estimated pitch rate of the vehicle by using various known methods. In addition, a driving torque candidate group generation unit 12 generates a driving torque candidate group from the estimated pitch rate calculated by a pitch rate estimation unit 11.

As described above, an object of the present disclosure is to select the most appropriate driving torque that minimizes the cost function through optimal control. To this end, the driving torque candidate group generation unit 12 needs to first generate candidates for driving torque that may be generated by the vehicle. For example, in a situation in which a positive torque needs to be provided to reduce the pitch motion, torques that may be generated by a controller are divided at regular intervals and set in advance. In this case, since it is necessary to perform control in the direction of reducing the pitch motion, torque candidate groups $k_u$ obtained by multiplying the estimated pitch rate $\dot{\hat{\theta}}$ by a gain of a certain size (proportional gain control) are set. For example, assuming that the P control candidate group $k_u$ is set to a vector of [0, 200, 400, 600, 800, 1000, . . . , 2000, 2200], the torque candidate group $k_u\dot{\hat{\theta}}$ is determined by [0, 200, 400, 600, 800, 1000, . . . , 2000, 2200]*$\dot{\hat{\theta}}$. In this example, the range of the proportional gain has been defined from 0 to 2200 at intervals of 200 (a total of 12-dimensional vectors). The maximum proportional gain of the candidate group selection has been set (about 8000) in consideration of the limit of the drive system and the range of the estimated pitch rate, and the interval (the dimension of the vector) has been selected (about 20) in consideration of the amount of data.

2. Estimation of Objective Function Related to Pitch Motion Reduction From Driving Torque Candidates The pitch reduction-related objective function generation unit 21 receives the driving torque candidates generated by the driving torque candidate group generation unit 12 and generates an objective function related to pitch motion (or pitch) reduction. The objective function is a function modeled as a proportional relationship between the driving torque and the pitch reduction. In this case, since the pitch motion reduction becomes advantageous as the driving torque increases, the objective function is determined in inverse proportion to the size of the driving torque candidate groups so that the objective function $J_\theta$ becomes gradually smaller.

More specifically, the objective function related to the pitch motion reduction is $$J_\theta(x, u) = \frac{1}{\left(k_u\hat{\theta}\right)^2},$$

and this equation is the same as the one introduced in the description of abbreviations above. This objective function is generated as the inverse of the square of the driving torque candidate groups. The reason for this is to set $J_\theta$ to be small in response to the increasing value of the driving torque because the effect of the pitch motion reduction increases as the driving torque increases. Also, the reason for squaring is to calculate a positive number. For example, in the previous example, if the driving torque candidate group $k_u\hat{\theta}$ [0, 200, 400, 600, 800, 1000, . . . , 2000, 2200]*$\hat{\theta}$ and a $\hat{\theta}$ value is 0.05, then $J_\theta$=0.0001*[infinite, 11.111, 2.7778, 1.2346, 0.6944, 0.4444, 0.3086, 0.2268, 0.1736, 0.1372, 0.1111, 0.0918] by the calculation of equation.

3. Estimate Current Pitch Value from Estimated Pitch Rate

The integrator 31 estimates the current pitch value by integrating the estimated pitch rate calculated by the pitch rate estimation unit 11. In this case, it is determined whether the control according to the present disclosure is entered (activated) or terminated (finished) (32), and the pitch value estimation operation is reset (initialized) every time the control is entered.

A detailed description thereof will be provided below. To estimate the longitudinal acceleration, it is necessary to estimate the current pitch motion value. This operation is the current pitch value estimation operation. To this end, the estimated pitch rate is integrated in the integrator 31 to estimate the pitch value (pitch motion value). However, in the present disclosure, the pitch estimation is not always performed, but is performed only when the control operation according to the present disclosure is activated (the control is entered) when passing over a bump (and also in the case of a dip). Thereafter, when it is determined that a vehicle has completely crossed a bump, the control is terminated, and the estimation of the abnormal pitch is also terminated. Therefore, it is necessary to initialize (reset) the pitch estimation at every entry after the termination of the control to start integration from the initial pitch value (i.e., zero (0)). This is to reduce the pitch estimation error due to the acceleration/deceleration of the vehicle during driving on flat ground, uphill, or downhill.

4. Determine Target Constraints of Longitudinal Acceleration and Jerk

Before generating a longitudinal acceleration reduction-related objective function and a jerk reduction-related objective function, a target constraint determination unit 41 determines the target constraints of the longitudinal acceleration and jerk.

Specifically, when the pitch motion is excessively reduced through the control method according to the present disclosure, a large acceleration is generated. To prevent this, the target constraint is set so as not to control the longitudinal acceleration to become too large. In other words, as the magnitude of the driving torque increases, the vehicle longitudinal acceleration reduction becomes disadvantageous, and the target constraint is determined to generate the objective function in proportion to the size of driving torque candidate groups so that the objective function L related thereto (related to the longitudinal acceleration) gradually increases (the same is true for the target constraint of jerk). In a region above the acceleration constraint according to the design intention, the size of the objective function is intentionally increased to exclude it from optimal control input candidates.

For example, when an acceleration greater than 2.943 m/s$^2$ occurs, a driver will feel much discomfort, so in order to perform control such that an acceleration greater than the value does not occur, the longitudinal acceleration target constraint $\overline{a_x}$=2.943 may be set up.

5. Estimation of Acceleration (Longitudinal Acceleration) Candidate Group and Generation of Longitudinal Acceleration Reduction-Related Objective Function By receiving the driving torque candidate groups generated by the driving torque candidate group generation unit 12 and the pitch motion value estimated by the integrator 31, the longitudinal acceleration reduction-related objective function generation unit 51 estimates the longitudinal acceleration candidate group and generates the acceleration-related objective function. In this case, the acceleration is estimated using longitudinal vehicle dynamics together with a longitudinal acceleration sensor (e.g., G sensor) 52 installed in the vehicle. The acceleration target constraint determined by the target constraint determination unit 41 is referred to in order to generate the objective function.

The acceleration candidate group is longitudinal accelerations estimated from the driving torque candidate groups. The definition of the acceleration candidate group is as follows.

$$\hat{a}_x = \min\left[\frac{1}{m}\left\{\frac{k_u\hat{\theta}}{r_{dyn}} - (C_{r1} + C_{r2}v_x)mg\cos\hat{\theta} - mg\sin\hat{\theta} - \frac{1}{2}\rho C_d A_F v_x^2\right\}, \frac{k_u\hat{\theta}}{r_{dyn}m}\right]$$

Here, m denotes a vehicle mass, $r_{dyn}$ denotes a rolling radius of the wheel, $C_{r1}$ and $C_{r2}$ denote rolling resistance coefficients, $v_x$ denotes the longitudinal vehicle velocity, p denotes an air density, $C_d$ denotes an air resistance coefficient, and $A_F$ denotes an area of a front of a vehicle. Also, the pitch motion reduction-related objective function is as follows, which has already been described in the explanation of the abbreviations.

$$J_a(x, u) = \begin{cases} \sqrt{(\hat{a}_x)^2} & (|a_x| \le |\overline{a_x}|) \\ \text{Penalty} & (|a_x| > |\overline{a_x}|) \end{cases}$$

The above objective function was generated as the square root of the square of the estimated longitudinal acceleration $\hat{a}_x$ generated by the driving torque candidate groups. The reason for this is to set $J_a$ to be large in response to the increasing value of the driving torque value because the magnitude of the acceleration increases as the driving torque value increases. The reason for squaring is to calculate a positive number, and the reason for taking the square root is to adjust the overall size of the objective function. In addition, in order to prevent the acceleration from increasing above a certain size $\overline{a_x}$ by setting the acceleration constraint, when the acceleration is greater than the target acceleration $\overline{a_x}$, $J_a$ is set to a very large value (i.e., penalty). For example, when $\hat{a}_x$ is [0, 0.1, 0.25, 0.4, 0.55, 0.7, 0.9, 1.1, 1.4, 1.7, 2.1, 2.7] and $\overline{a_x}$ is 1.962, if the penalty is set to 10$^6$, $J_a$=[0, 0.1, 0.25, 0.4, 0.55, 0.7, 0.9, 1.1, 1.4, 1.7, 10$^6$, 10$^6$] from the calculation of the equation.

6. Estimation of Jerk Candidate Group and Generation of Jerk Reduction-Related Objective Function A jerk reduction-related objective function generation unit 61 estimates the jerk candidate group from the current acceleration candidate groups generated in the acceleration reduction-related objective function generation unit 51, and generates the jerk-related objective function. In this case, the estimation of jerk is performed using a wheel speed sensor 62 installed in a vehicle. The jerk target constraint determined by the target constraint determination unit 41 is referred to in order to generate the objective function.

In this operation, since the jerk reduction becomes disadvantageous as the magnitude of the driving torque increases, the objective function is determined in proportion to the size of the driving torque candidate groups so that the objective function $J_{jerk}$ becomes gradually larger. In a region above the jerk constraint according to the design intention, the size of the objective function is intentionally increased to exclude it from the optimal control input candidates.

This will be described in detail. The jerk candidate group is the estimates of jerk that will occur when the driving torque is applied in the current vehicle situation. These jerk estimates are generated by dividing the difference between the estimated longitudinal acceleration candidate groups and the current acceleration obtained from the G sensor by the sampling time (0.01 seconds). That is, the estimate of jerk is calculated as $$\overline{jerk} = \frac{\hat{a}_x - a_{x,curr}}{T_s}.$$

Here, $a_{x,curr}$ denotes the acceleration of the current state and $T_s$ denotes the sampling time of the controller, which is 0.01 sec. In addition, the definition of the jerk candidate group is as follows.

$$J_{jerk}(x, u) = \begin{cases} \sqrt{(\overline{jerk})^2} & (|jerk| \le |\overline{jerk}|) \\ \text{Penalty} & (|jerk| > |\overline{jerk}|) \end{cases}$$

In performing the control of the present disclosure, when a large jerk occurs, the ride comfort will be reduced. To consider this as the objective function, the square root of the square of the estimated jerk was set as the objective function. Also, like the longitudinal acceleration, situations in which a very large jerk occurs should be avoided to prevent the deterioration in ride comfort. To this end, when a jerk occurs above the jerk constraint $|\overline{jerk}_x|$, the penalty is given, and thus the objective function $J_{jerk}$ is designed to be very large. For example, if the current acceleration is $a_{x,curr}=0.1$, the estimated longitudinal acceleration vector $\hat{a}_x=[0, 0.1, 0.25, 0.4, 0.55, 0.7, 0.9, 1.1, 1.4, 1.7, 2.1, 2.7]$, $|\overline{jerk}_x|=16$, and Penalty=$10^6$, the jerk candidate group $\overline{jerk}=[-10, 0, 15, 30, 45, 60, 80, 100, 130, 160, 200, 260]$. Also, the jerk objective function $J_{jerk}=[10, 0, 15, 10^6, 10^6, 10^6, 10^6, 10^6, 10^6, 10^6, 10^6, 10^6]$.

7. Operation of Determining Final Objective Function

A final objective function determination unit 71 calculates the final objective function as a linear sum of the three objective functions generated above. The final objective function is determined by $J=J_\theta+w_1 J_a+w_2 J_{jerk}$. Here, $w_1$ and $w_2$ are weights, and mean that when the final objective function is determined, it is possible to suppress the longitudinal acceleration from increasing by increasing $w_1$, and it is possible to suppress the jerk from increasing by increasing $w_2$. Depending on the relative size of $w_1$ and $w_2$, the contribution effect on the control of the longitudinal acceleration and jerk may be applied differently. Details of the weights will be described below.

8. Determination of Weight According to Control Intention

Before the final objective function determination unit 71 determines the final objective function, the weight determination unit 72 may determine weights of constants or variables in consideration of the importance of the objective functions of the pitch reduction, the longitudinal acceleration, and the jerk. For example, when the weight $w_1$ of the acceleration objective function increases, the designer's intention to suppress the acceleration from increasing is reflected, and when the weight $w_2$ of the jerk objective function increases, the designer's intention to suppress the jerk from increasing is reflected. These weights may be set as constants or variables.

In detail, the importance of each objective function is determined according to the intention of the controller designer. For example, some vehicle models may focus on reducing pitch motion, while other vehicle models may generate much pitch motion, but instead, may focus on minimizing the longitudinal acceleration. As such, the weight determination unit 72 serves to adjust the control of the pitch motion, the longitudinal acceleration, and the jerk according to the concept and design intention of the vehicle model.

The term "importance" used here means "the degree of conformity to the concept of the vehicle or vehicle model and the designer's intention." For example, when only the reduction of the pitch motion is important, the weights $w_1$ and $w_2$ may be set to zero (0). Then, even when much acceleration and jerk occur, the pitch motion reduction performance may be secured. In addition, since the designer does not need to consider jerk, when only the pitch motion reduction and the longitudinal acceleration reduction is important, only the weight $w_1$ increases and $w_2$ is set to 0. In addition, in this situation, to reduce the longitudinal acceleration more actively than reducing the pitch motion, when the value $w_1$ of the initially set weight increases, the longitudinal acceleration is suppressed (however, the performance of the pitch motion will be somewhat worse in return). Finally, to reduce the pitch motion, reduce the longitudinal acceleration, and reduce the jerk, both the weights $w_1$ and $w_2$ need to be considered.

Here, the determination of the weight may be performed by appropriate tuning through simulation and experimentation. Also, the weights $w_1$ and $w_2$ may be determined as constants or variables.

9. Determination of Final Driving Torque Minimizing Objective Function

Finally, this is an operation of determining the driving torque for driving the wheels of the vehicle. Here, an objective function minimization algorithm 73 is used, and the final driving torque value that minimizes the determined final objective function is determined. To this end, first, the driving torque candidates having the smallest final objective function may be selected, and the final driving torque amount may be determined from the selected candidates.

This will be described in detail. First, the "optimal control" concept used in the present disclosure will be briefly described through the formulation of linear optimal control theory.

The optimal control is a control technique that may derive the best solution when all situations may not be improved at the same time. The control input u is determined to minimize the cost function during the entire control cycle by setting a cost function J that is the target of the control. In this regard, an example of the optimal control theory is introduced as follows.

(Example) Linear Quadratic Regulator (LQR) Problem
In Regulator Problem, (where, x = error)
System Equation: x = Ax + Bu, y = Cx ($x_0$ is known)
Cost function (target of minimization) is defined as follows.
$J(x(t), u(t)) = x^T(t_f)Hx(t_f) + \int_{t_0}^{t_f}\{x^T(t)Qx(t) + u^T(t)Ru(t)\}dt$
Control input is determined as follows.

$$u^* = \underset{u}{\mathrm{argmin}}(J(x, u))$$

As described above, the cost function to be minimized (i.e., the objective function described above in the present disclosure) is defined, and a control input (in the present disclosure, the wheel applied driving torque) whose cost function is the smallest (minimized) is obtained for every control cycle. According to the optimal control theory, the smaller the cost function, the more optimal the control that meets the control intention. The present disclosure applies this concept to the control of passage along an uneven road such as one with bumps and dips.

For better understanding, the process of selecting the driving torque by the above-described control method according to the present disclosure at a certain moment will be described as an example. The explanation below is a comprehensive summary of what was exemplified in each operation above.

When the driving torque candidate groups $k_u\hat{\theta}$ are [0, 200, 400, 600, 800, 1000, . . . , 2000, 2200]*$\hat{\theta}$ and the $\hat{\theta}$ value is 0.05, $k_u\hat{\theta}$=[0, 10, 20, 30, 40, 50, 60, 70, 80, 90, 100, 110]. $J_\theta$=0.0001*[infinite, 11.111, 2.7778, 1.2346, 0.6944, 0.4444, 0.3086, 0.2268, 0.1736, 0.1372, 0.1111, 0.0918] from the calculation of the formula. In addition, when $\hat{a}_x$ is [0, 0.1, 0.25, 0.4, 0.55, 0.7, 0.9, 1.1, 1.4, 1.7, 2.1, 2.7], $\overline{a_x}$ is 1.962 and the penalty is set to $10^6$, $J_a$=[0, 0.1, 0.25, 0.4, 0.55, 0.7, 0.9, 1.1, 1.4, 1.7, $10^6$, $10^6$] from the calculation of the formula. In addition, when the current acceleration $a_{x,curr}$=0.1, the estimated longitudinal acceleration vector $a_{x,curr}$=[0, 0.1, 0.25, 0.4, 0.55, 0.7, 0.9, 1.1, 1.4, 1.7, 2.1, 2.7]. |jerk$_x$|=16, and Penalty=$10^6$, the jerk candidate group $\overline{jerk}$=[−10, 0, 15, 30, 45, 60, 80, 100, 130, 160 200, 260]. Also, the jerk objective function $J_{jerk}$=[10, 0, 15, $10^6$, $10^6$, $10^6$, $10^6$, $10^6$, $10^6$, $10^6$, $10^6$, $10^6$].

Assuming that weights of $w_1$=5e$^{-4}$ and $w_2$=2e$^{-4}$ are set for control that considers the pitch motion, the longitudinal acceleration, and the jerk, the final objective function is calculated as $J=J_\theta+w_1J_a+w_2J_{jerk}$, and therefore J=[infinite, 0.0012, 0.0034, 200.0003, 200.0004, 200.0005, 200.0006, 200.0007, 200.0008, 200.0009, 700, 70].

$$u^* = \underset{u}{\mathrm{argmin}}\{J(x, u)\}$$

finds the optimal driving torque input u* that minimizes J among the control inputs (u, driving torque candidate groups), and thus is adopted as a second control input having a minimum of 0.0012. Then, the optimal driving torque is determined to be 10.

In this way, the objective function is obtained for every control period and the minimum value is obtained to determine the optimal driving torque in the order corresponding to the minimum value.

When a slightly smaller effect of the jerk reduction is expected, $w_2$ may be reduced a little more. In this case, for example, when the weights are controlled to be $w_1$=5e$^{-4}$ and $w_2$=2e$^{-5}$, the final objective function is calculated as $J=J_\theta$+$w_1J_a+w_2J_{jerk}$, and therefore J=[Infinite, 0.0012, 0.0007, 20.0003, 20.0003, 20.0004, 20.0005, 20.0006, 20.0007, 20.0009, 520, 520] is obtained. In this case, the optimal control input is adopted as a third control input having a minimum of 0.0007 in $$u^* = \underset{u}{\mathrm{argmin}}\{J(x, u)\}.$$

Therefore, the final driving torque is determined to be 20. As such, it can be seen that the intention of control changes according to the values of $w_1$ and $w_2$.

Figure 4:
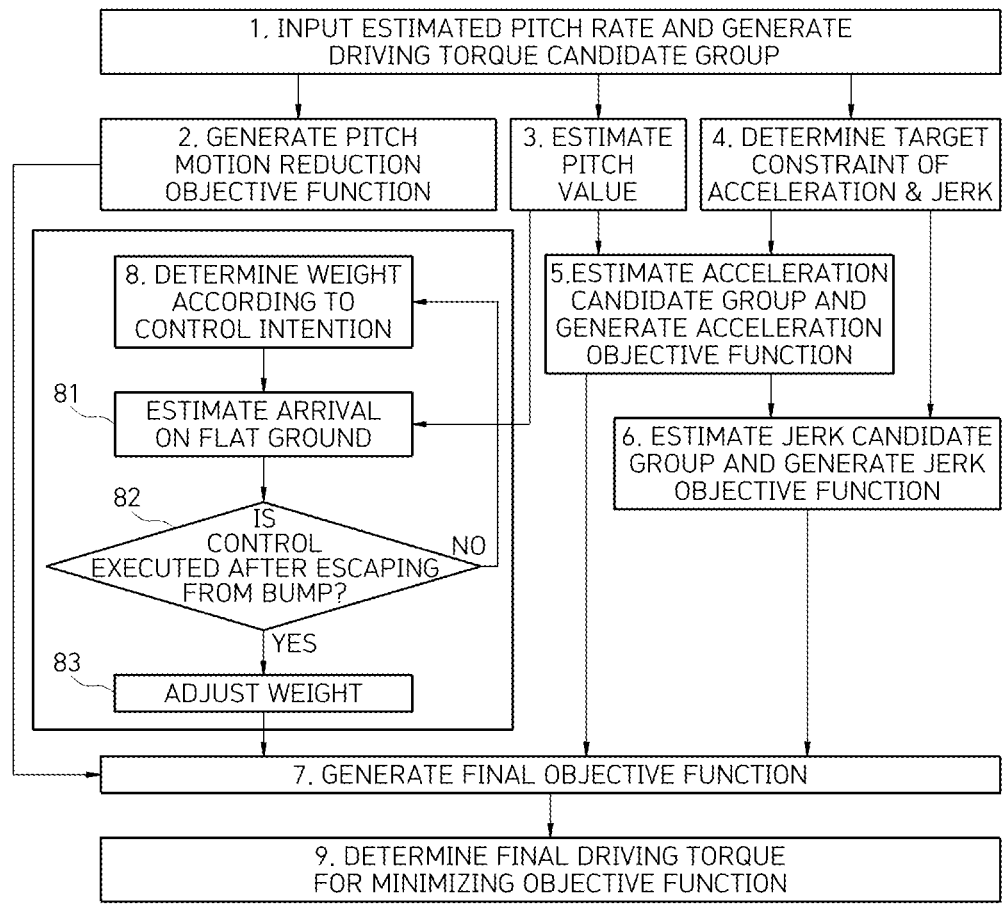
FIG. 4 is a control logic flow diagram of a modified embodiment of control logic of FIG. 2.
Figure 5:
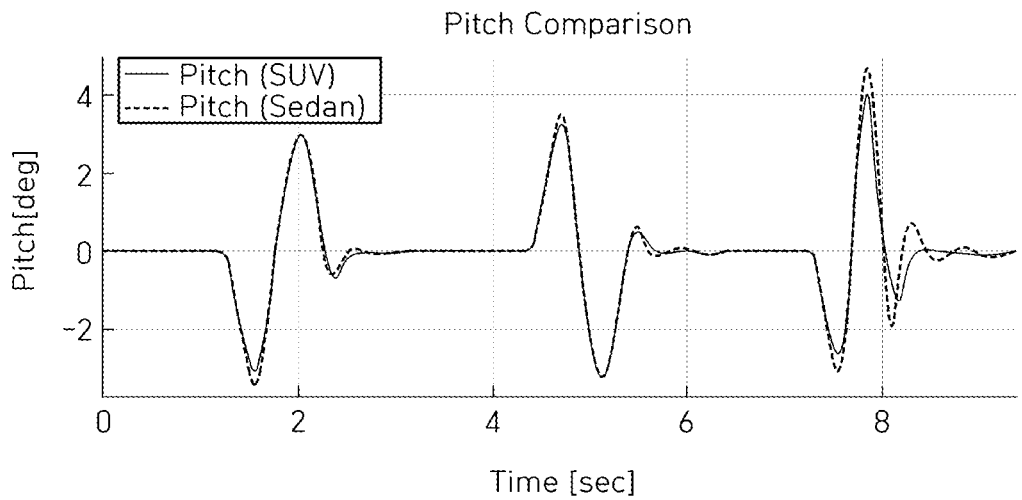
FIG. 5 is a diagram illustrating a simulation result of pitch motion of a sport utility vehicle (SUV) and a sedan.

FIG. 4 is a modified embodiment of the weight determination logic 8 illustrated in FIG. 2. Compared to an SUV, because a sedan-type passenger car has a lower vehicle body and a center of gravity located lower, the pitch motion is larger (see FIG. 5). In particular, when starting to drive on flat ground after passing over a large bump (or dip), the pitch motion additionally occurs one or two more times. FIG. 5 illustrates a pitch motion simulation result for a scenario in which an SUV and a sedan vehicle pass over a long bump, a long dip, and a short bump in order at a speed of 30 km/h. The pitch motion of the passenger car (sedan) is generally larger than that of the SUV, and in particular, it can be confirmed that the pitch motion additionally occurs even after escaping from the bump in the section after 8 seconds (sec) and reaching flat ground.

In order to apply the present disclosure in consideration of the characteristics of the passenger car, an additional control routine is executed in the weight determination process of the weight determination unit 72 in response to the additional pitch motion after passing over the bump (or dip) as illustrated in FIG. 4. The sub-operations 81 to 83 were added to operation 8 (weight determination) of the control flowchart according to the embodiment of FIG. 2 as a supplement.

First, by synthesizing the pitch value estimated in operation 3 of FIG. 2 and the signals calculated for the control entry, it is determined whether the current vehicle has passed over a bump (or dip) and then reached flat ground (81).

An index for determining whether to perform control after escaping from the bump is calculated, and thus it is determined whether to execute control (additional control) after escaping from the bump (82). Whether to perform additional control is determined by synthesizing the estimated pitch rate value, the control entry/termination (ON/OFF) signal, and the control end time. After the size of the estimated pitch rate exceeds a certain value, a certain amount of time needs to be maintained, and it is performed after all the controls when passing over a bump or dip ends. Specific values and times are tuned through experiments and simulations.

When the additional control is determined, the weight is adjusted so that the pitch motion is suppressed more than the suppression of the longitudinal acceleration and jerk in the section where the pitch motion additionally occurs once or twice (after escaping from the bump) (83). After the weight is adjusted, operation 8 of the control method of FIG. 2 is performed. The weight adjustment is the same as described with reference to FIGS. 2 and 3. That is, operation 83 of the embodiment of FIG. 4 is the same process as operation 8 (determining the weight according to the control intention) of FIG. 2.

FIGS. 6 to 9 are simulation results for showing the improvement of the ride comfort control technique according to the present disclosure compared to the related art.

Figure 6:
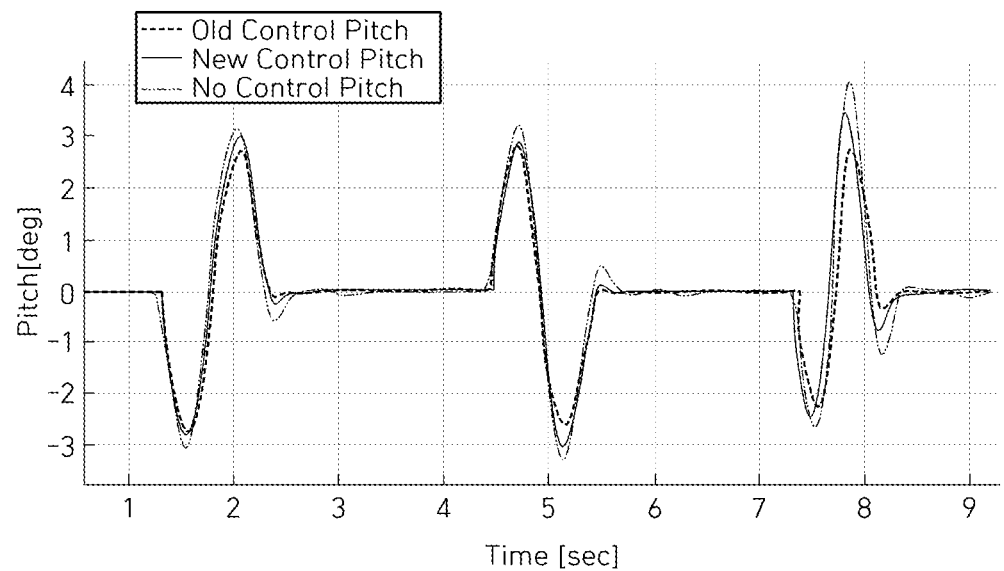
FIG. 6 is a diagram illustrating a result of pitch motion simulation according to old control, new control, and no control.

FIG. 6 illustrates a pitch motion according to Old control of the conventional technique, New control of the present disclosure, and No control in a scenario in which an SUV passes over a long (or wide) bump, a wide dip, and a short (or narrow) bump in order at a speed of 30 km/h.

Figure 7:
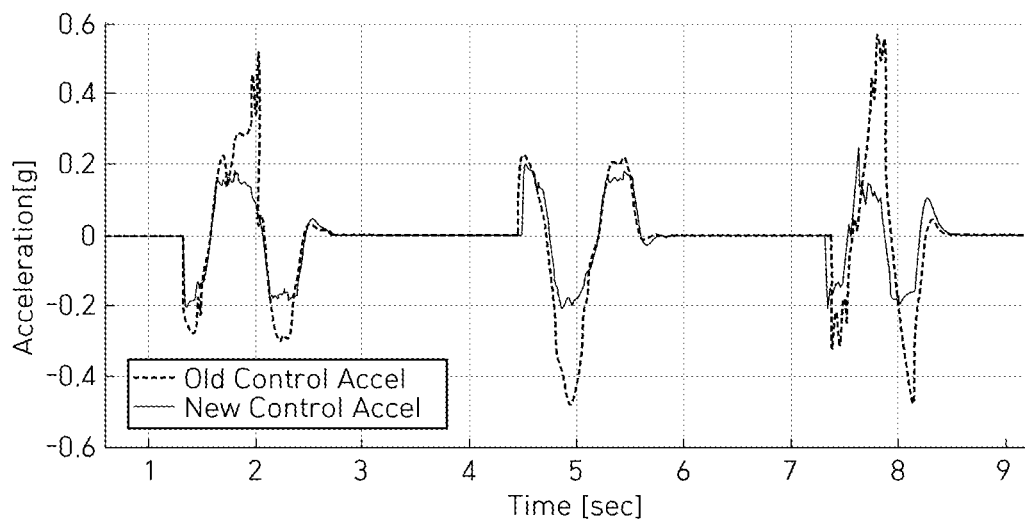
FIG. 7 is a diagram illustrating a longitudinal acceleration simulation result according to the old control and the application of the technique of the present disclosure.

FIG. 7 illustrates the longitudinal acceleration according to the old control and the new control in the same scenario.

Figure 8:
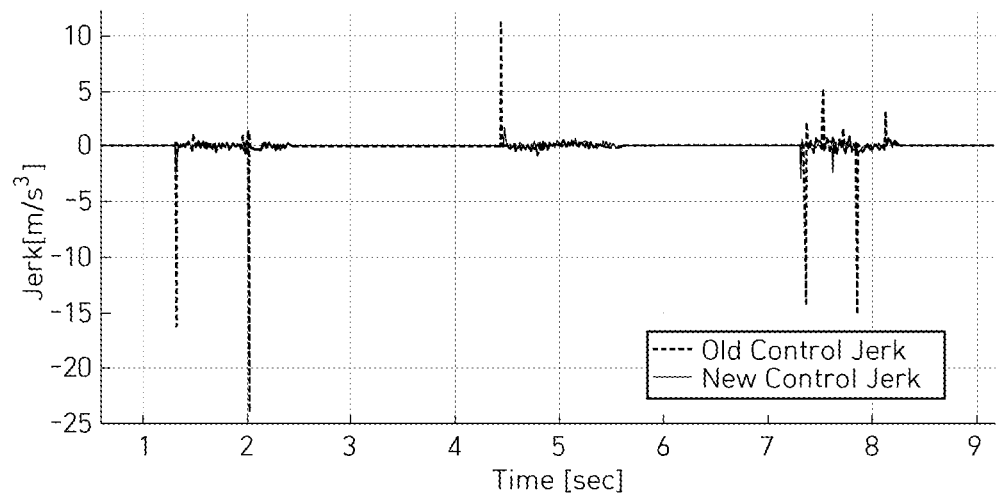
FIG. 8 is a diagram illustrating a jerk simulation result according to the old control and the application of the technique of the present disclosure.

FIG. 8 illustrates a jerk according to the old control and the new control in the same scenario.

Figure 9:
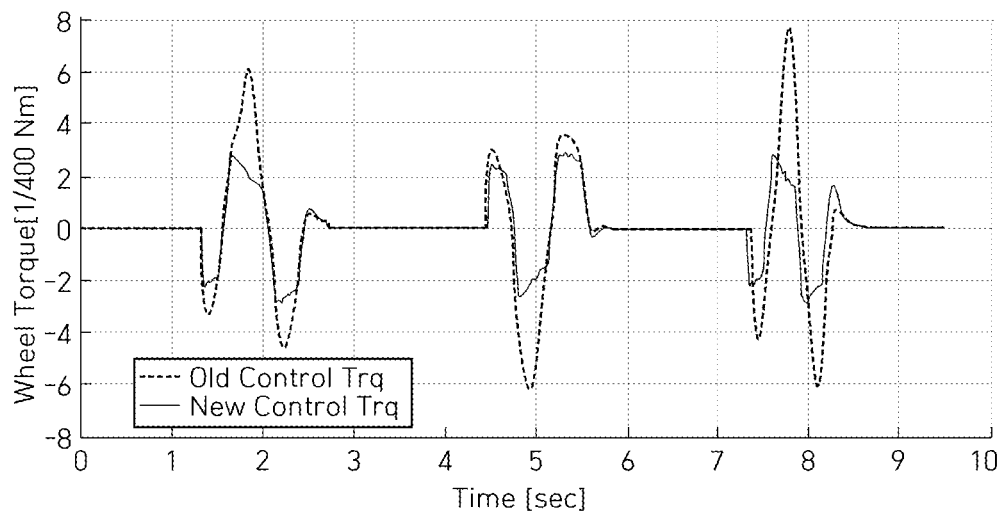
FIG. 9 is a diagram illustrating a wheel input torque simulation result according to the old control and the application of the technique of the present disclosure.

FIG. 9 illustrates the wheel input torque according to the old control and the new control in the same scenario.

Through the above simulation, compared with the related art (proportional gain control), the present technique (optimal control) has the following characteristics.

The control technique according to the present disclosure prevents the longitudinal acceleration from increasing beyond a certain level as illustrated in FIG. 7 by limiting the control input torque as illustrated in FIG. 9. Also, it is possible to improve ride comfort by preventing the jerk from rapidly increasing as illustrated in FIG. 8. However, it can be seen that the pitch motion reduction performance somewhat decreases as illustrated in FIG. 6.

These results are due to the inverse relationship between the pitch motion reduction, the longitudinal acceleration, and the jerk reduction. That is, as the longitudinal acceleration and the degree of jerk are greatly reduced, the pitch motion reduction performance greatly deteriorates, and when the longitudinal acceleration and the degree of jerk are slightly reduced, the pitch motion reduction performance deteriorates less. This degree may be adjusted while changing the weight in operation 7 of the control flowchart of FIGS. 2 and 4.

In control according to the related art (for example, proportional gain control (or P control)), effective control for decrease in pitch motion can be performed, but magnitudes of longitudinal acceleration and jerk become rather large, resulting in impairing ride comfort. On the other hand, according to the present disclosure, it is possible to perform control that considers overall ride comfort, so it is possible to control both the longitudinal acceleration and jerk as well as the pitch motion occurring when passing along an uneven road to be reduced. According to the present disclosure, it is possible to effectively improve a decrease in ride comfort due to longitudinal acceleration and jerk that are not considered in the related art.

Although the present disclosure has been described with reference to exemplary embodiments of the present disclosure, those skilled in the art will appreciate that various modifications and alterations may be made without departing from the spirit or essential feature of the present disclosure. Therefore, it should be understood that the above-mentioned embodiments are exemplary in all aspects and are not limiting.

What is claimed is:

1. A method of controlling torque of a vehicle, the method comprising steps of:
 a) calculating a torque candidate group from an estimated pitch rate;
 b) generating a pitch motion reduction objective function from the torque candidate group;
 c) estimating a vehicle acceleration candidate group corresponding to the torque candidate group generated in step a);
 d) generating a longitudinal acceleration reduction objective function by synthesizing a predetermined acceleration constraint and the estimated vehicle acceleration candidate group;
 e) estimating a jerk candidate group by calculating a current acceleration value obtained from a sensor installed in the vehicle, the jerk candidate group being estimated by subtracting the current acceleration value from an estimated longitudinal acceleration vector and dividing by a sampling period;
 f) generating a jerk reduction objective function by synthesizing a preset jerk constraint and the jerk candidate group;
 g) selecting a candidate having the smallest value among the objective functions and determining a driving torque of the vehicle corresponding to the selected candidate; and
 h) generating the driving torque to apply the control.

2. The method of claim 1, wherein, in step b), the pitch motion reduction objective function is generated in inverse proportion to a size of the torque candidate group so that the pitch motion reduction objective function gradually decreases as a magnitude of the driving torque increases.

3. The method of claim 1, wherein, in step d), the longitudinal acceleration reduction objective function is generated in proportion to a size of the torque candidate group so that the longitudinal acceleration reduction objective function gradually increases as a magnitude of the driving torque increases.

4. The method of claim 1, wherein, in step d), a size of the objective function increases in a region above the acceleration constraint.

5. The method of claim 1, wherein, in step f), the objective function is generated in proportion to a size of driving torque candidate group so that the jerk reduction objective function gradually increases as a magnitude of the driving torque increases.

6. The method of claim 1, wherein, in step f), a size of the objective function increases in a region above the jerk constraint.

7. The method of claim 1, wherein step g) further includes applying a weight to the objective functions calculated in steps b), d) and f).

8. The method of claim 7, wherein, in applying the weight, a first weight related to longitudinal acceleration and a second weight related to jerk are applied to the objective function.

9. An apparatus for controlling torque of a vehicle, the apparatus comprising:
 a driving torque candidate group generation unit configured to calculate a torque candidate group from an estimated pitch rate from a pitch rate estimation unit;
 a pitch reduction-related objective function generation unit configured to generate a pitch motion reduction objective function from the generated torque candidate group;
 an acceleration reduction objective function generation unit configured to generate a longitudinal acceleration reduction objective function by estimating a vehicle acceleration candidate group each corresponding to one of the torque candidate group generated by the driving torque candidate group generation unit and synthesizing a preset acceleration constraint and the estimated vehicle acceleration candidate group;
 a jerk reduction objective function generation unit configured to generate a jerk reduction objective function by estimating a jerk candidate group by calculating a current acceleration value obtained from a longitudinal acceleration sensor installed in the vehicle, the jerk candidate group being estimated by subtracting the current acceleration value from an estimated longitudinal acceleration vector and dividing by a sampling period, and synthesizing a preset jerk constraint and the jerk candidate group; and a final objective function determination unit configured to select a candidate having the smallest value among objective functions, determine a driving torque of the vehicle corresponding to the selected candidate, and generate the driving torque to apply the control.

10. The apparatus of claim 9, wherein the pitch motion reduction objective function generation unit generates the pitch motion reduction objective function in inverse proportion to a size of driving torque candidate group so that the pitch motion reduction objective function gradually decreases as the magnitude of the driving torque increases.

11. The apparatus of claim 9, wherein the longitudinal acceleration reduction objective function generation unit generates the longitudinal acceleration reduction objective function in proportion to a size of driving torque candidate group so that the longitudinal acceleration reduction objective function gradually increases as the magnitude of the driving torque increases.

12. The apparatus of claim 9, wherein the longitudinal acceleration reduction objective function generation unit increases a size of the objective function in a region above the acceleration constraint.

13. The apparatus of claim 9, wherein the jerk reduction objective function generation unit generates the objective function in proportion to the size of the driving torque candidate group so that the jerk reduction objective function gradually increases as a magnitude of the driving torque increases.

14. The apparatus of claim 9, wherein the jerk reduction objective function generation unit increases a size of the objective function in a region above the jerk constraint.

15. The apparatus of claim 9, further comprising a weight determination unit configured to apply a weight to the objective function calculated in the pitch motion reduction objective function generation unit, the acceleration reduction objective function generation unit, and the jerk reduction objective function generation unit.

16. The apparatus of claim 15, wherein the weight determination unit applies to the objective function a first weight related to longitudinal acceleration and a second weight related to jerk.

* * * * *